(12) United States Patent
Gove

(10) Patent No.: US 11,516,374 B2
(45) Date of Patent: Nov. 29, 2022

(54) UNDER-DISPLAY IMAGE SENSOR

(71) Applicant: Synaptics Incorporated, San Jose, CA (US)

(72) Inventor: Robert J. Gove, Los Gatos, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 341 days.

(21) Appl. No.: 16/654,290

(22) Filed: Oct. 16, 2019

(65) Prior Publication Data

US 2020/0389575 A1 Dec. 10, 2020

Related U.S. Application Data

(60) Provisional application No. 62/857,740, filed on Jun. 5, 2019.

(51) Int. Cl.
*H04N 5/225* (2006.01)
*H04N 13/254* (2018.01)

(52) U.S. Cl.
CPC ......... *H04N 5/2257* (2013.01); *H04N 5/2256* (2013.01); *H04N 13/254* (2018.05)

(58) Field of Classification Search
None
See application file for complete search history.

(56) References Cited

U.S. PATENT DOCUMENTS

| | | |
|---|---|---|
| 5,667,474 A | 9/1997 | Nishimura |
| 6,798,406 B1 * | 9/2004 | Jones ................ H04N 13/275 345/419 |
| 7,239,909 B2 | 7/2007 | Zeman |
| 8,937,646 B1 * | 1/2015 | Baldwin ............... H04N 5/262 348/47 |
| 9,188,662 B2 | 11/2015 | You et al. |

(Continued)

FOREIGN PATENT DOCUMENTS

| | | |
|---|---|---|
| CN | 105094307 A | 11/2015 |
| CN | 109188711 A | 1/2019 |

(Continued)

OTHER PUBLICATIONS

Ivanov Bonev et al., "Light Source for Camera," U.S. Appl. No. 16/544,488, filed Aug. 19, 2019.

(Continued)

*Primary Examiner* — Eileen M Adams
(74) *Attorney, Agent, or Firm* — Paradice & Li LLP

(57) ABSTRACT

A device includes a display and a first light source configured to emit light, wherein the first light source is proximate to the display. The device further includes a first camera disposed behind the display, wherein the first camera is configured to detect reflections of the light emitted by the first light source. The first camera is further configured to capture a first image based at least in part on the reflections, wherein the reflections are partially occluded by the display. The device also includes a second camera proximate to the display, wherein the second camera is configured to capture a second image. In addition, the device includes a depth map generator configured to generate depth information about one or more objects in a field-of-view (FOV) of the first and second cameras based at least in part on the first and second images.

22 Claims, 15 Drawing Sheets

(56) References Cited

U.S. PATENT DOCUMENTS

| | | | |
|---|---|---|---|
| 9,317,243 B2* | 4/2016 | Becze | G06F 3/04842 |
| 9,377,623 B2 | 6/2016 | Robbins et al. | |
| 9,638,511 B2 | 5/2017 | Boppart et al. | |
| 9,953,214 B2 | 4/2018 | Yin et al. | |
| 9,977,960 B2 | 5/2018 | Gustafsson et al. | |
| 10,120,442 B2 | 11/2018 | Liu et al. | |
| 10,148,918 B1* | 12/2018 | Seiger | G06Q 10/087 |
| 10,491,885 B1* | 11/2019 | Hicks | H04N 13/275 |
| 10,606,349 B1 | 3/2020 | Ouderkirk et al. | |
| 2004/0263786 A1* | 12/2004 | Williams | A61B 3/0025 351/246 |
| 2006/0010400 A1 | 1/2006 | Dehlin et al. | |
| 2007/0057211 A1 | 3/2007 | Bahlman et al. | |
| 2008/0106628 A1 | 5/2008 | Cok et al. | |
| 2009/0141116 A1 | 6/2009 | Kanade et al. | |
| 2012/0026325 A1 | 2/2012 | Bunker et al. | |
| 2012/0032875 A1 | 2/2012 | Sprawl et al. | |
| 2012/0169669 A1 | 7/2012 | Lee et al. | |
| 2012/0229610 A1* | 9/2012 | Fukushima | H04N 13/302 348/47 |
| 2012/0249724 A1 | 10/2012 | Morrison | |
| 2012/0313906 A1* | 12/2012 | Tamaki | G02F 1/1335 345/204 |
| 2013/0016256 A1* | 1/2013 | Yahagi | H04N 13/111 348/240.2 |
| 2013/0033593 A1* | 2/2013 | Chinnock | A61B 3/14 348/78 |
| 2014/0055978 A1* | 2/2014 | Gantz | H04B 1/3888 362/8 |
| 2015/0163400 A1* | 6/2015 | Geiss | G06V 40/107 348/231.99 |
| 2015/0253931 A1 | 9/2015 | Wyrwas et al. | |
| 2015/0304627 A1* | 10/2015 | Sheikh Faridul | H04N 13/15 348/42 |
| 2015/0310253 A1 | 10/2015 | Agrawal et al. | |
| 2016/0041384 A1 | 2/2016 | Robbins et al. | |
| 2016/0092717 A1* | 3/2016 | Ling | G06V 40/1318 345/173 |
| 2016/0116944 A1* | 4/2016 | Lee | G06F 1/1681 361/679.26 |
| 2016/0117860 A1 | 4/2016 | Fei et al. | |
| 2016/0180591 A1 | 6/2016 | Shiu et al. | |
| 2016/0309134 A1* | 10/2016 | Venkataraman | G01C 11/06 |
| 2016/0335778 A1* | 11/2016 | Smits | G06T 7/20 |
| 2017/0038597 A1* | 2/2017 | Li | H04N 13/31 |
| 2017/0069097 A1* | 3/2017 | Molgaard | H04N 13/239 |
| 2017/0094141 A1 | 3/2017 | Hicks | |
| 2017/0131766 A1 | 5/2017 | He et al. | |
| 2017/0154570 A1 | 6/2017 | Suh et al. | |
| 2017/0192499 A1 | 7/2017 | Trail | |
| 2017/0220838 A1 | 8/2017 | He et al. | |
| 2017/0220844 A1 | 8/2017 | Jones et al. | |
| 2017/0220884 A1 | 8/2017 | Yamada | |
| 2017/0243373 A1* | 8/2017 | Bevensee | H04N 7/22 |
| 2017/0272731 A1* | 9/2017 | Kashyap | G01S 17/87 |
| 2018/0068430 A1 | 3/2018 | Sang et al. | |
| 2018/0139431 A1* | 5/2018 | Simek | H04N 13/254 |
| 2018/0157908 A1 | 6/2018 | Sahlsten et al. | |
| 2018/0197482 A1 | 7/2018 | Choi et al. | |
| 2018/0198980 A1 | 7/2018 | Takagi et al. | |
| 2018/0300589 A1 | 10/2018 | Levinshtein et al. | |
| 2018/0332205 A1* | 11/2018 | Hawthorne | H04N 13/243 |
| 2018/0338049 A1* | 11/2018 | Wachi | H04N 5/2254 |
| 2019/0132570 A1* | 5/2019 | Chen | G06T 7/50 |
| 2019/0158713 A1 | 5/2019 | McMillan et al. | |
| 2019/0164522 A1 | 5/2019 | Bonnier et al. | |
| 2019/0187539 A1* | 6/2019 | Salmimaa | H04N 5/2256 |
| 2019/0294108 A1* | 9/2019 | Ozcan | G03H 1/0866 |
| 2019/0318677 A1 | 10/2019 | Lu et al. | |
| 2019/0333233 A1* | 10/2019 | Hu | G06K 9/6289 |
| 2020/0099920 A1 | 3/2020 | Khamis et al. | |
| 2020/0195764 A1 | 6/2020 | Xu et al. | |
| 2020/0265206 A1 | 8/2020 | Chung et al. | |

FOREIGN PATENT DOCUMENTS

| | | |
|---|---|---|
| WO | 2017052766 A1 | 3/2017 |
| WO | 2017161520 A1 | 9/2017 |
| WO | 2018/049201 A1 | 3/2018 |
| WO | 2019045750 A1 | 3/2019 |

OTHER PUBLICATIONS

Kim et al., "Under-Display Image Sensor for Eye Tracking," U.S. Appl. No. 16/704,523, filed Dec. 5, 2019.

International Search Report and Written Opinion dated Sep. 3, 2020, issued in International Application No. PCT/US2020/034301, filed May 22, 2020, 11 pages.

International Search Report and Written Opinion dated Sep. 9, 2020, issued in International Application No. PCT/US2020/035761, filed Jun. 2, 2020, 12 pages.

International Search Report and Written Opinion dated Feb. 24, 2021, issued in International Application No. PCT/US2020/059367, filed Nov. 6, 2020, 11 pages.

* cited by examiner

UNDER-DISPLAY IMAGE SENSOR

CROSS-REFERENCE TO RELATED APPLICATION

This application claims the benefit of co-pending and commonly owned U.S. Provisional Patent Application No. 62/857,740 entitled "UNDER-DISPLAY IMAGE SENSOR," filed on Jun. 5, 2019, the entirety of which is hereby incorporated by reference.

TECHNICAL FIELD

The present embodiments relate generally to systems and methods for imaging, and specifically to under-display image sensors.

BACKGROUND OF RELATED ART

Many electronic devices such as smartphones, tablets, laptops and other computing systems include a camera and display. The camera is often disposed within a region of the device that provides an unobstructed view of the environment. Thus, when integrated on the same surface as the display, the camera is often disposed adjacent to the display, within a notch or cutout. This often results in a large, unsightly black border around the display, which may detract from the device's appearance and limit the device's screen-to-body ratio.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A device is disclosed. The device may include a display and a first light source configured to emit light, wherein the first light source is proximate to the display. The device may further include a first camera disposed behind the display, wherein the first camera is configured to detect reflections of the light emitted by the first light source. The first camera may be further configured to capture a first image based at least in part on the reflections, wherein the reflections are partially occluded by the display. The device may also include a second camera proximate to the display, wherein the second camera is configured to capture a second image. In addition, the device may include a depth map generator configured to generate depth information about one or more objects in a field-of-view (FOV) of the first and second cameras based at least in part on the first and second images.

BRIEF DESCRIPTION OF THE DRAWINGS

The present embodiments are illustrated by way of example and are not intended to be limited by the figures of the accompanying drawings.

DETAILED DESCRIPTION

Figure 1:
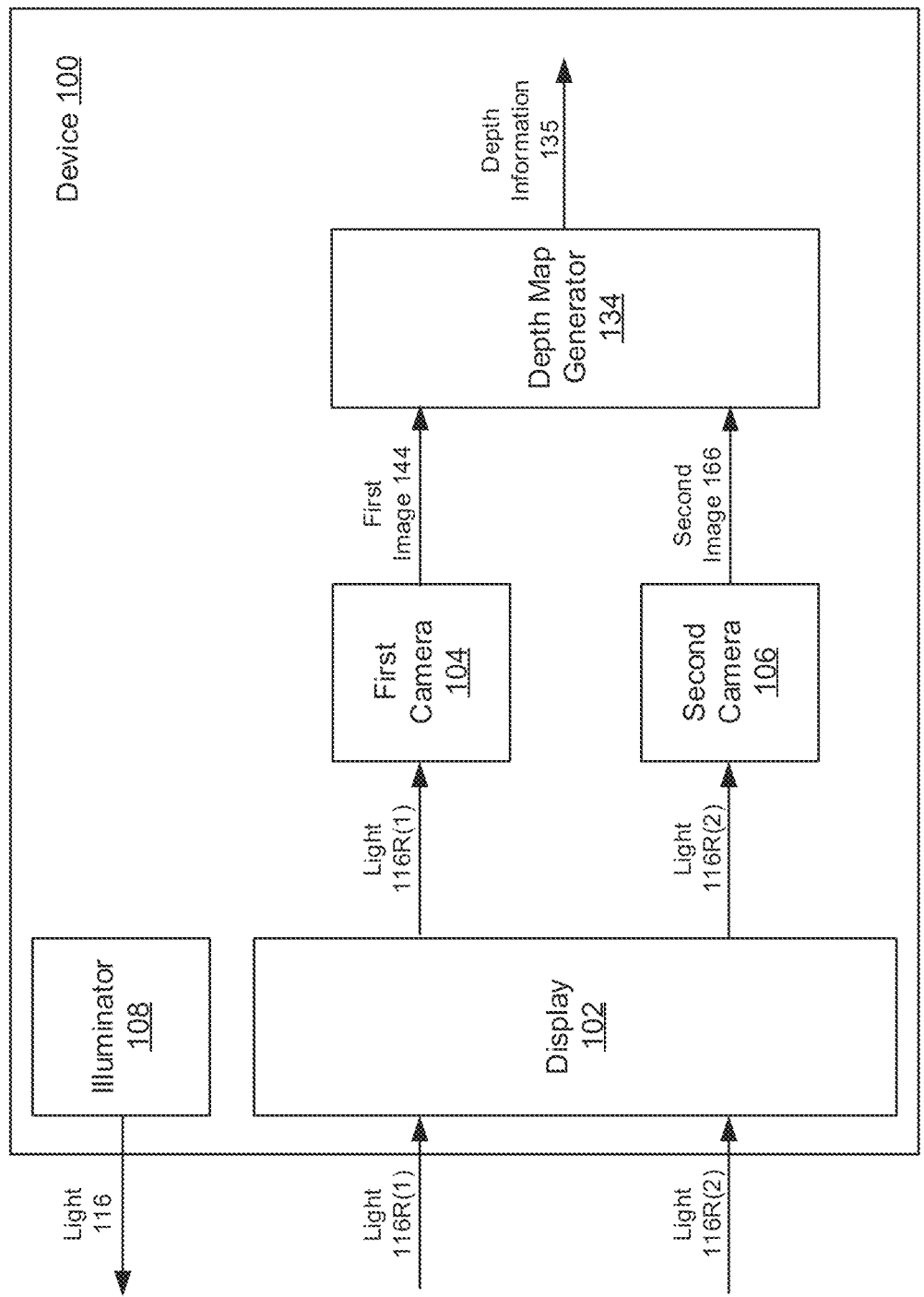
FIG. 1 shows a block diagram of an electronic device, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, controller, microcontroller, and/or state machine capable of executing scripts or instructions of one or more software programs stored in memory.

Aspects of the disclosure provide a system and method for imaging that can be implemented behind a display of an electronic system or device. In some embodiments, the electronic system may include a display, at least one illuminator (also referred to herein as a "first light source"), and an imaging system including two or more cameras (also referred to herein as "camera sensors"). In some embodiments, the display may comprise a porous display such as, for example, an organic light-emitting diode (OLED) display or a micro light-emitting diode (micro-LED) display. The illuminator may comprise a NIR light-emitting diode (LED) or other light source capable of emitting wavelengths of light in the infrared (IR) spectrum. The cameras may be configured to detect light in the IR spectrum (and these cameras are also referred to herein as "NIR cameras"). Further, the cameras may be separated by a threshold distance. The separation distance between the cameras enables the imaging system to collect depth information about an object(s) in the cameras' FOV. For example, each of the cameras may capture an image of the object, and stereopsis may be used to extract depth information about the object from the images.

In some embodiments, the cameras may be disposed under the display. In this configuration, the cameras' FOV may be partially obstructed by display pixels and/or display sub-pixels in the display. However, aspects of the present disclosure recognize that the display may contain "holes" or empty space between the display pixels and/or display sub-pixels for at least some light to filter through. In some embodiments, a neural network model (e.g., a convolutional neural network (CNN)) may be used to filter out noise or interference, such as a "screen door effect," which may be caused by the display pixels and/or display sub-pixels in the display. The resulting image is therefore suitable for depth sensing and/or other image processing. Among other advantages, this eliminates the need for an unsightly black border, cutouts, or notches in the bezel of the display. Further, the electronic system's screen-to-body ratio may be enhanced, and the electronic system may support infinity display.

FIG. 1 shows a block diagram of an electronic device 100 (also referred to as "device 100"), in accordance with some embodiments. The electronic device 100 includes an illuminator 108, a display 102, a first camera 104, a second camera 106, and a depth map generator 134.

The illuminator 108 is configured to illuminate an object or scene being imaged. In some embodiments, the illuminator 108 may be configured to emit IR light (e.g., NIR light). Further, the illuminator 108 may comprise a LED (e.g., NIR LED), or the illuminator 108 may comprise display pixels and/or display sub-pixels in the display 102. Further, in some embodiments, the device 100 may include more than one illuminator 108.

The display 102 is configured to display visual information to a user, to receive user input, and/or to transmit light from an object or scene being imaged to the first and second cameras 104 and 106. The display 102 may comprise a porous display, such as an OLED display or a micro-LED display, which contains holes or gaps between display pixels and/or display sub-pixels. In some embodiments, the display 102 may include a transparent layer configured to transmit light from the object or scene being imaged to the first and second cameras 104 and 106.

Each of the first camera 104 and the second camera 106 is configured to capture an image of an object or scene in front of the display 102. The first camera 104 and the second camera 106 may each comprise an array of active pixel sensors (e.g., photodiodes, complementary metal oxide semiconductor (CMOS) image sensor arrays, charge coupled device (CCD) arrays), and/or any other sensors capable of detecting wavelengths of light in the visible spectrum, the IR spectrum, or the ultraviolet spectrum. In some embodiments, each of the first and second cameras 104 and 106 may be configured to detect light in the IR or non-visible spectrum. Further, each of the first and second cameras 104 and 106 may be configured to filter or reject visible light that is emitted and/or transmitted by the display 102. In other embodiments, both the first and second cameras 104 and 106 may be configured to detect visible light, or the first camera 104 may be configured to detect NIR light and the second camera 106 may be configured to detect visible light.

As shown in FIG. 1, each of the first and second cameras 104 and 106 is disposed behind (or proximate to) the display 102. With this configuration, light from an object or scene being imaged may refract or bend as it passes through the display 102 to the cameras 104 and 106. Further, display pixels and/or display sub-pixels in the display 102 may partially obstruct the cameras' FOV. However, each of the first and second cameras 104 and 106 may still image the object or scene through the display 102 because, as discussed above, the display 102 is porous, which permits some light to pass through the display 102 to the cameras. Further, each of the first and second cameras 104 and 106 may be configured to perform wide-range imaging, where an object or scene is imaged either close up or far away. It is noted that, while two cameras are depicted in the example of FIG. 1, other implementations of the electronic device 100 may include only one camera, or the implementations may include more than two cameras.

The depth map generator 134 may be configured to determine depth information about an object or scene imaged by the first camera 104 and the second camera 106. More specifically, the depth map generator 134 may be configured to receive images captured by the first and second cameras 104 and 106, and the depth map generator 134 may use stereopsis to combine the images and to extract depth information from the images.

During operation, the illuminator 108 may emit light 116 to illuminate a scene in front of the first camera 104 and the second camera 106. Objects in the scene may reflect at least a portion of the light 116 back towards the display 102, for example, as reflected light 116R(1) and 116(R2). Some of the reflected light 116R(1) and 116R(2) may be occluded by display pixels and/or display sub-pixels in the display 102, while the remainder of the reflected light 116R(1) and 116R(2) passes through the holes or gaps between the display pixels and/or display sub-pixels. The reflected light 116R(1) and 116R(2) that passes through the holes may be detected by the first camera 104 and the second camera 106, respectively. The first camera 104 may capture the reflected light 116R(1) that is detected as a first image 144, and the second camera 106 may capture the reflected light 116R(2) that is detected as a second image 166. Further, the depth map generator 134 may receive the first and second images 144 and 166 and combine the images to extract depth information 135 about the objects.

Figure 2:
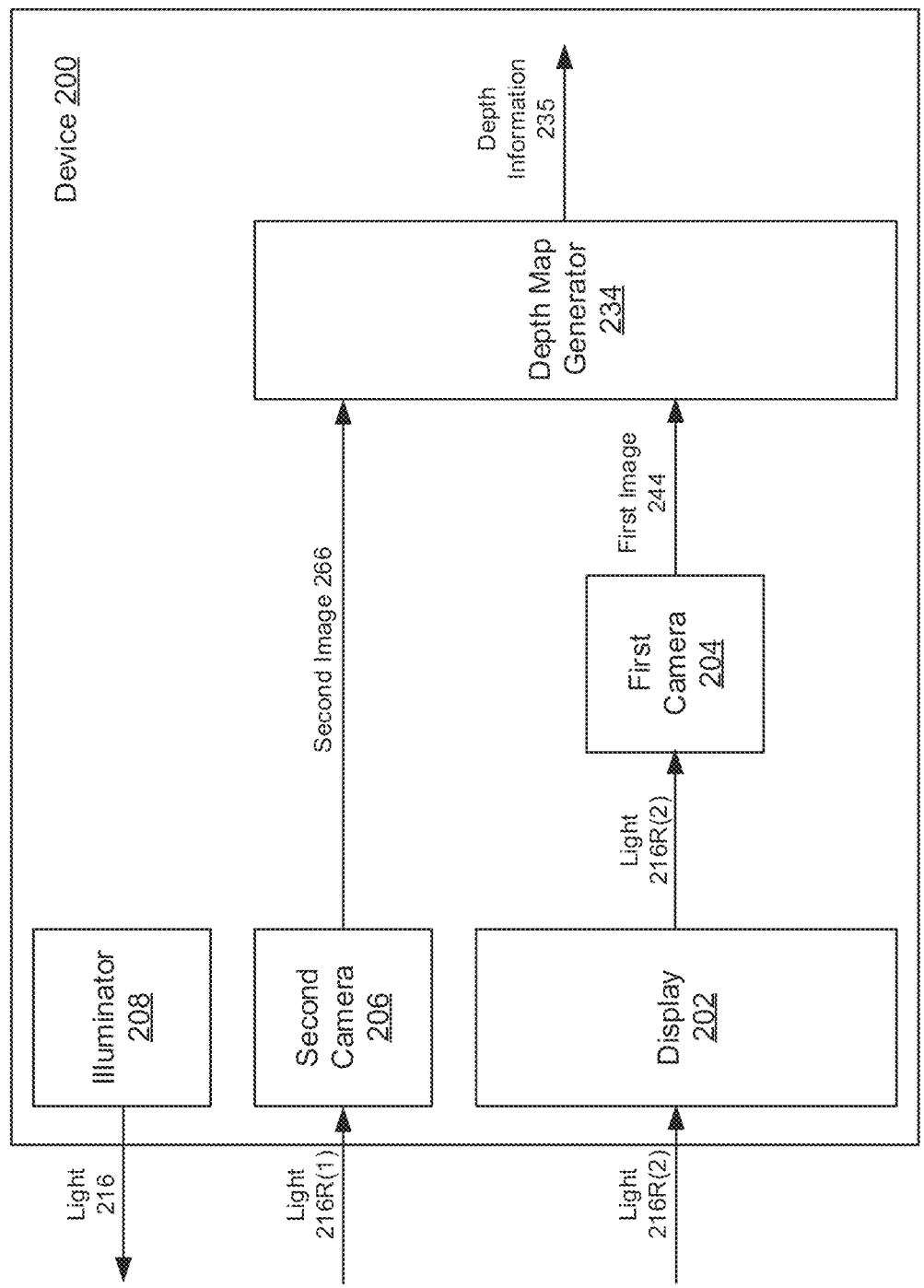
FIG. 2 shows a block diagram of an electronic device, in accordance with some embodiments.

FIG. 2 shows a block diagram of an electronic device 200 (also referred to as "device 200"), in accordance with some embodiments. The electronic device 200 may be an embodiment of the electronic device 100 of FIG. 1. As shown in FIG. 2, the first camera 204 is disposed behind the display 202 and the second camera 206 is disposed proximate to the display 202 (or in the same plane as the display 202 and the illuminator 208). In some embodiments, the first camera 204 may be a NIR camera, and the second camera 206 may be configured to detect light in the visible spectrum (e.g., including the red, green, and blue (RGB) color components of the light) ("RGB camera"). In other embodiments, the second camera 206 may be a NIR camera.

During operation, the illuminator 208 may emit light 216 to illuminate a scene in front of the first camera 204 and the second camera 206. Objects in the scene may reflect at least a portion of the light 216 back towards the display 202, for example, as reflected light 216(R)(1) and 216(R)(2). As shown in FIG. 2, the reflected light 216(R)(1) (and/or light from the sun or another illuminator) is detected by the second camera 206 and captured in the second image 266. Further, the reflected light 216(R)(2) may be occluded by display pixels and/or display sub-pixels in the display 202, while the remainder of the reflected light 216(R)(2) passes through holes or gaps between the display pixels and/or display sub-pixels. The reflected light 216(R)(2) that is detected by the first camera 204 is captured in the first image 244. As described above with reference to FIG. 1, the depth map generator 234 may receive and combine the first and second images 244 and 266 to extract depth information 235 about the objects.

Figure 3A:
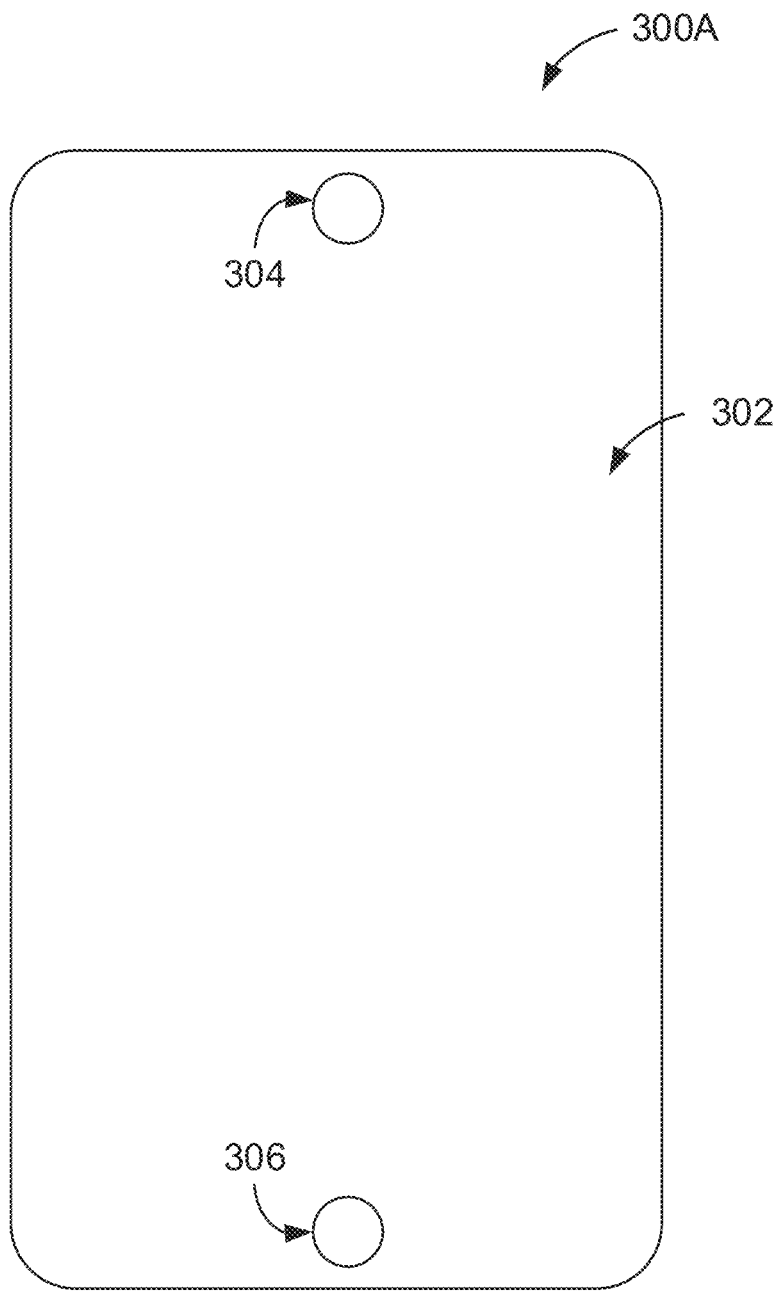
FIG. 3A shows an example electronic system, in accordance with some embodiments.

FIG. 3A shows an example electronic system 300A, in accordance with some embodiments. The electronic system 300A may be an embodiment of the electronic devices 100 and/or 200 of FIGS. 1 and 2. As shown in FIG. 3A, the electronic system 300A includes a display 302, and cameras 304 and 306.

The display 302 may comprise a porous display, such as an OLED display or a micro-LED display, which contains holes or gaps between display pixels and/or display sub-pixels. Each of the cameras 304 and 306 may comprise an array of active pixel sensors (e.g., photodiodes, CMOS image sensor arrays, CCD arrays, and/or any other sensors capable of detecting wavelengths of light in the visible spectrum, the infrared spectrum, or the ultraviolet spectrum). Further, the cameras 304 and 306 may be configured to perform wide-range imaging, where an object or scene is imaged either close up or far away. It is noted that, while two cameras are depicted in the example of FIG. 3A, other implementations of the electronic system 300A may include fewer or more cameras than those depicted in FIG. 3A. In some embodiments, each of the cameras 304 and 306 may be configured to support depth sensing by capturing an image of an object. Stereopsis may then be used to combine the images in order to perceive the depth and/or three-dimensional (3D) structure of the object. It is further noted that, during operation, electronic system 300A may be positioned or mounted in a vertical, horizontal, or diagonal orientation relative to a scene or object being imaged.

In some embodiments, the cameras 304 and 306 may be disposed under the display 302. With this configuration, display pixels and/or display sub-pixels in the display 302 may partially obstruct the cameras' FOV. However, the cameras 304 and 306 may still image an object or scene through the display 302 because the display 302 is porous. In other words, the display 302 may include holes or empty spaces between the pixels and/or sub-pixels. When light is emitted from a light source (such as illuminators 308 described further below), the light may reflect off an object or feature in front of the electronic system 300A, and then filter through the holes or empty spaces in display 302 to the cameras 304 and 306. In some embodiments, at least one of the cameras 304 and/or 306 is a NIR camera configured to detect light in the IR or non-visible spectrum. The NIR camera may filter or reject visible light, such as any light emitted by the display 302. In some other embodiments, one of the cameras 304 or 306 may be a RGB camera.

It is noted that, because the pixels in the display 302 will at least partially occlude the light passing through to the cameras 304 and/or 306, the image captured by the cameras will contain noise or interference (e.g., a "screen door effect"). In some embodiments, a neural network model (e.g., a CNN) may be used to filter out the noise or distortion in the images captured by the cameras 304 and 306. For example, the CNN may be trained to recognize or generate inferences about the screen door effect caused by the display pixels and/or display sub-pixels of the display 302. By removing the screen door effect, the resulting image may be suitable for depth sensing and/or further image analysis.

Figure 3B:
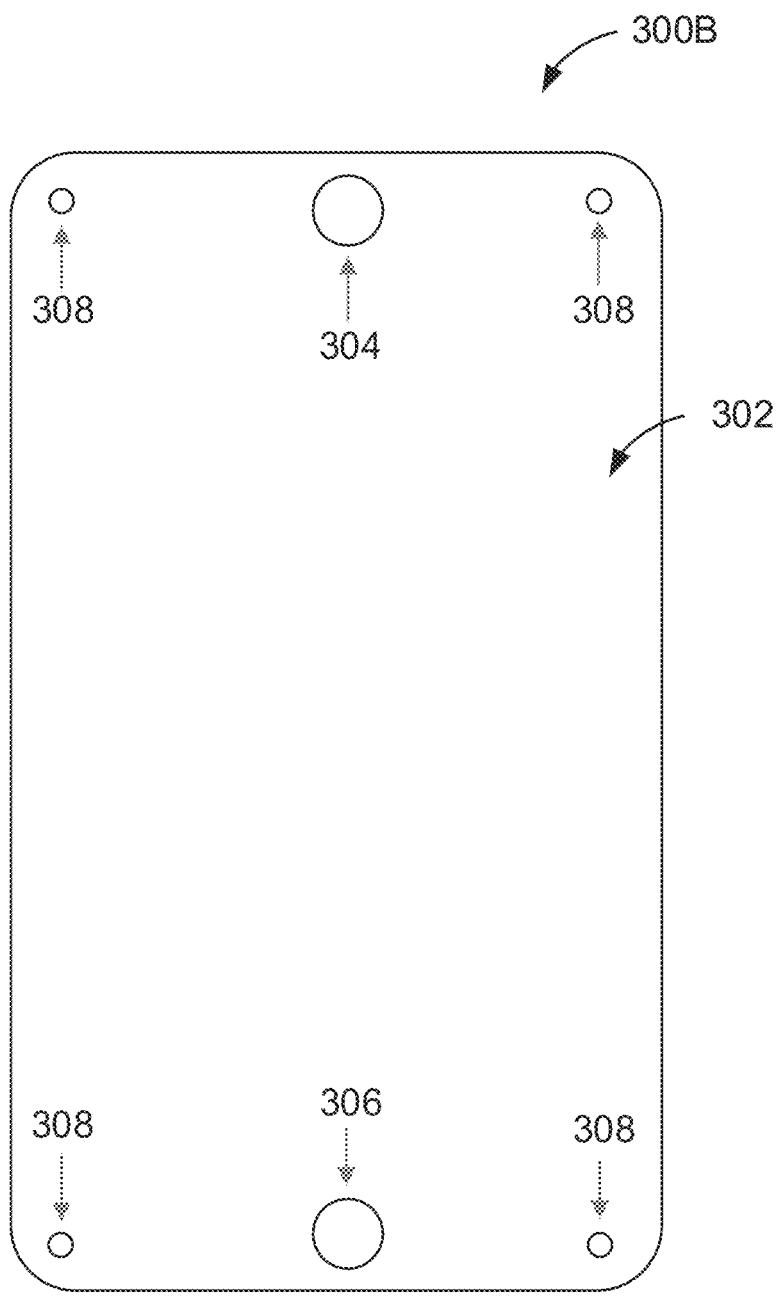
FIG. 3B shows an example electronic system, in accordance with some embodiments.

FIG. 3B shows an example electronic system 300B, in accordance with some embodiments. The electronic system 300B may be an embodiment of the electronic devices 100 and/or 200, and/or the electronic system 300A, described with reference to FIGS. 1, 2 and 3A. As shown in FIG. 3B, the illuminators 308 may be positioned near the corners of the electronic system 300B. Further, the illuminators 308 may be disposed under the display 302, in the same plane as the display 302, in the bezel of the display 302, or in any combination thereof. In some embodiments, the illuminators 308 may be configured to illuminate an object or scene being imaged. For example, the illuminators 308 may comprise LEDs (e.g., NIR LEDs), display pixels, and/or display sub-pixels configured to illuminate an object or scene using IR light.

Figure 3C:
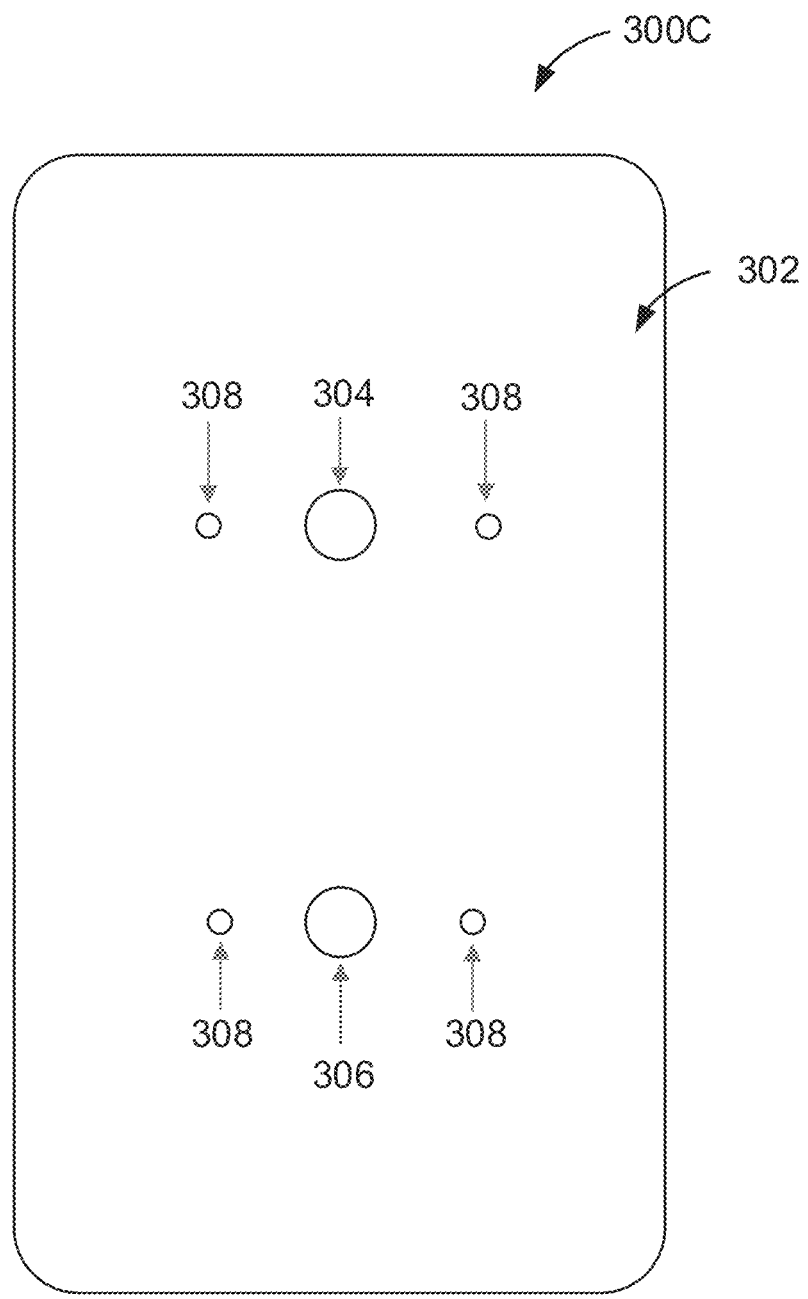
FIG. 3C shows an example electronic system, in accordance with some embodiments.

FIG. 3C shows an example electronic system 300C, in accordance with some embodiments. The electronic system 300C may be an embodiment of the electronic devices 100 and/or 200, and/or the electronic systems 300A and/or 300B, described with reference to FIGS. 1, 2, 3A and 3B. As shown in FIG. 3C, the cameras 304 and 306 may be disposed in the mid-region of the electronic system 300C, along the long axis. In contrast to FIG. 3B, the cameras 304 and 306 of FIG. 3C are separated by a smaller distance. As a result, the maximum distance at which cameras 304 and 306 of FIG. 3C sense depth may be more limited than that of the cameras in FIG. 3B. It is also noted that, in FIG. 3C, each of the cameras 304 and 306 is flanked by two illuminators 308. The illuminators 308 may be disposed under the display 302, in the same plane as display 302, in the bezel of the display 302, or in any combination thereof. In some embodiments, the illuminators 308 may be configured to illuminate an object or scene being imaged. For example, the illuminators 308 may comprise NIR LEDs configured to illuminate an object or scene using IR light.

Figure 3D:
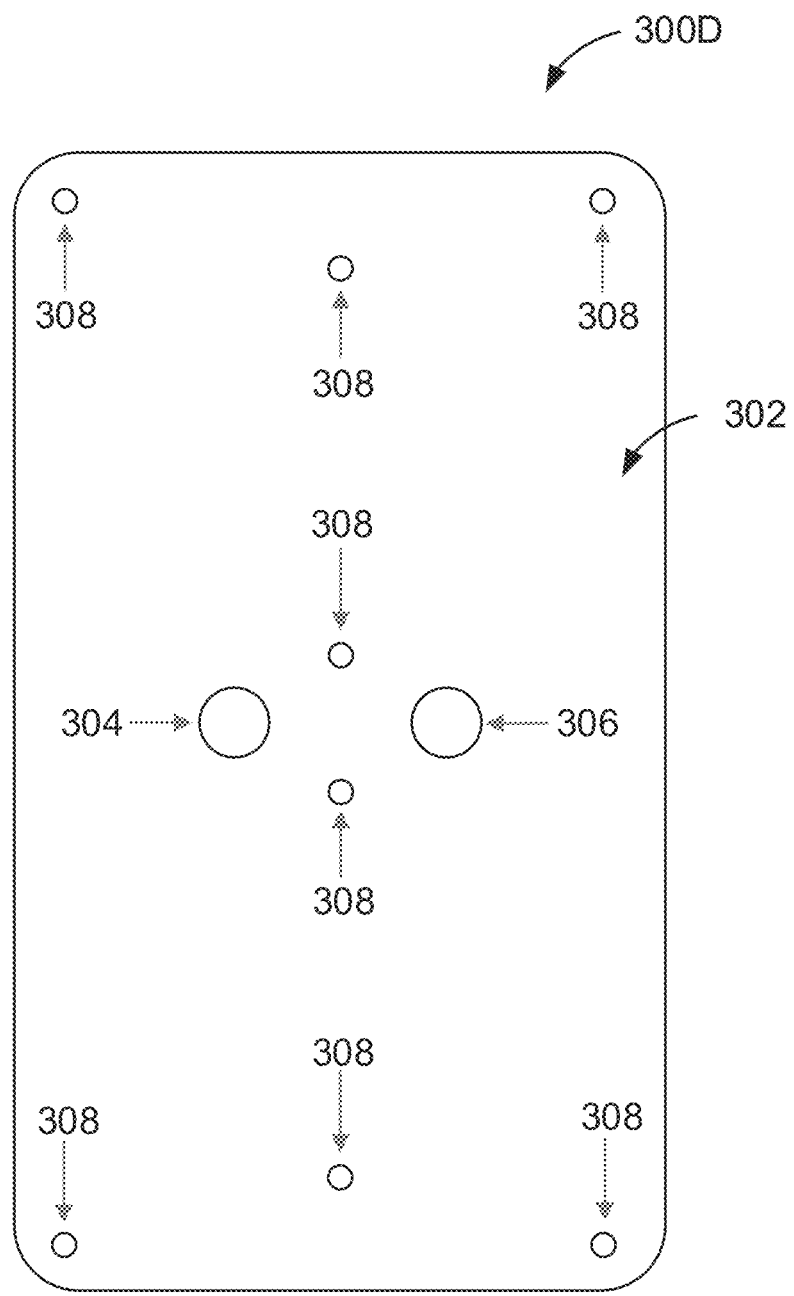
FIG. 3D shows an example electronic system, in accordance with some embodiments.

FIG. 3D shows an example electronic system 300D, in accordance with some embodiments. The electronic system 300D may be an embodiment of the electronic devices 100 and/or 200, and/or the electronic systems 300A-300C, described with reference to FIGS. 1, 2, 3A-3C. As shown in FIG. 3D, the cameras 304 and 306 may be disposed in the mid-region of the electronic system 300D, along the short axis. In contrast to FIG. 3C, the cameras 304 and 306 of FIG. 3D are separated by a shorter distance. As a result, the maximum distance at which cameras 304 and 306 of FIG. 3D sense depth may be more limited than that of the cameras in FIG. 3C. It is also noted that, in FIG. 3D, the illuminators 308 are disposed near the corners of the electronic system 300D, and toward the center of the electronic system 300D, along the long axis. The illuminators 308 may be disposed under the display 302, in the same plane as the display 302, in the bezel of the display 302, or in any combination thereof. In some embodiments, the illuminators 308 may be configured to illuminate an object or scene being imaged. For example, the illuminators 308 may comprise NIR LEDs configured to illuminate an object or scene using IR light.

Figure 4:
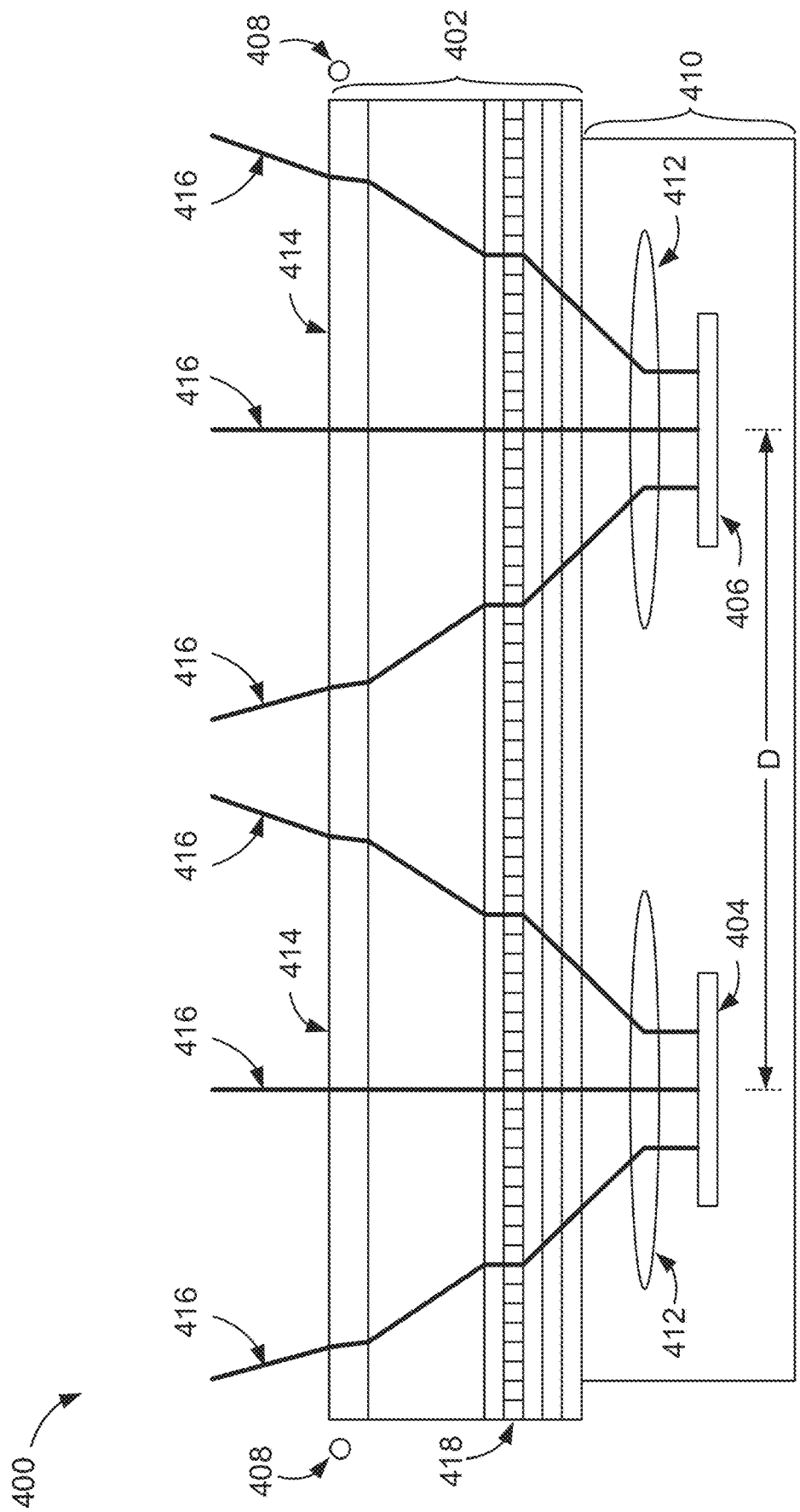
FIG. 4 shows a cross-section of an example electronic system, in accordance with some embodiments.

FIG. 4 shows a cross-section of an electronic system 400, in accordance with some embodiments. As shown in FIG. 4, the electronic system 400 includes display layers 402, illuminators 408, and camera module 410. The electronic system 400 may be an example embodiment of the electronic device 100 and/or the electronic systems 300A-300D described with respect to FIGS. 1 and 3A-3D.

The display layers 402 may comprise a plurality of layers of a porous display, such as an OLED display or a micro-LED display. As shown in FIG. 4, the display layers 402 may include a display surface 414 and emissive layer 418. In some embodiments, the emissive layer 418 may include a plurality of display pixels and/or display sub-pixels, with holes, gaps, or empty space between each of the display pixels and/or display sub-pixels. In some embodiments, at least one of the display layers 402 may comprise a transparent layer configured to transmit light from an object or scene being imaged to the cameras 404 and 406. Further, as shown in FIG. 4, light from the object or scene being imaged travels along optical paths 416 and may refract or bend as it passes through the display layers 402 and lenses 412 to the cameras 404 and 406.

In some embodiments, the illuminators 408 may be positioned adjacent to the display layers 402. The illuminators 408 may be disposed under the display layers 402, in the same plane as the display layers 402, in the bezel of the electronic system 400, or in any combination thereof. The illuminators 408 may be configured to illuminate an object or scene being imaged. For example, the illuminators 408 may comprise LEDs (e.g., NIR LEDs), display pixels, and/or display sub-pixels configured to illuminate an object or scene using IR light.

As shown in FIG. 4, the camera module 410 is disposed below the display layers 402, and may include cameras 404 and 406, and lenses 412. The cameras 404 and 406 may comprise NIR CMOS sensors configured for wide-range imaging, where an object or scene is imaged either close up or far away. The cameras 404 and 406 may be further configured to rapidly sense objects such as fingers, hands, and heads. Further, because the electronic system 400 includes two cameras, the cameras 404 and 406 may be configured to support depth sensing. The resolution of the depth sensing may depend on the distance of separation D between the cameras 404 and 406. In other words, the greater the distance D, the greater the amount of depth information that can be derived from the cameras 404 and 406. In some embodiments, the cameras 404 and 406 may be configured to operate in multiple modes such as low-power modes to support ambient light sensing (ALS) functions.

During operation, the illuminators 408 may illuminate an object or scene in front of the electronic system 400. For example, the illuminators 408 may emit IR light, which reflects off an object or scene, and then travels back toward the electronic system 400. The path of travel for the reflected IR light is depicted in FIG. 4 as optical paths 416. As shown in FIG. 4, the optical paths 416 pass through the display surface 414 to the emissive layer 418. In the emissive layer 418, some of the reflected IR light may be occluded by the display pixels and/or display sub-pixels of the display layers 402, but at least some of the reflected IR light may pass through holes or empty space between the display pixels and/or display sub-pixels. The remaining IR light then travels through the remaining display layers 402 and the lenses 412, to the cameras 404 and 406. Each of the cameras 404 and 406 may capture the reflected IR light as a separate image.

Aspects of the present disclosure recognize that by disposing the cameras 404 and 406 under the display layers 402, the images captured by the cameras 404 and 406 may include a "screen door effect" (illustrated in FIG. 6), distortion, or other artifacts caused by the IR light passing through the display layers 402. As described in more detail below, a neural network model (e.g., CNN) may be used to filter such distortions. Once the captured images are filtered, stereopsis may be used to extract depth information from the captured images. In some aspects, the depth information may be used to construct a depth map. In some other embodiments, the depth information may be used to generate a 3D image. Still further, in some aspects, the depth information may be used for biometric identification, authentication, or tracking, or for other applications.

Figure 5:
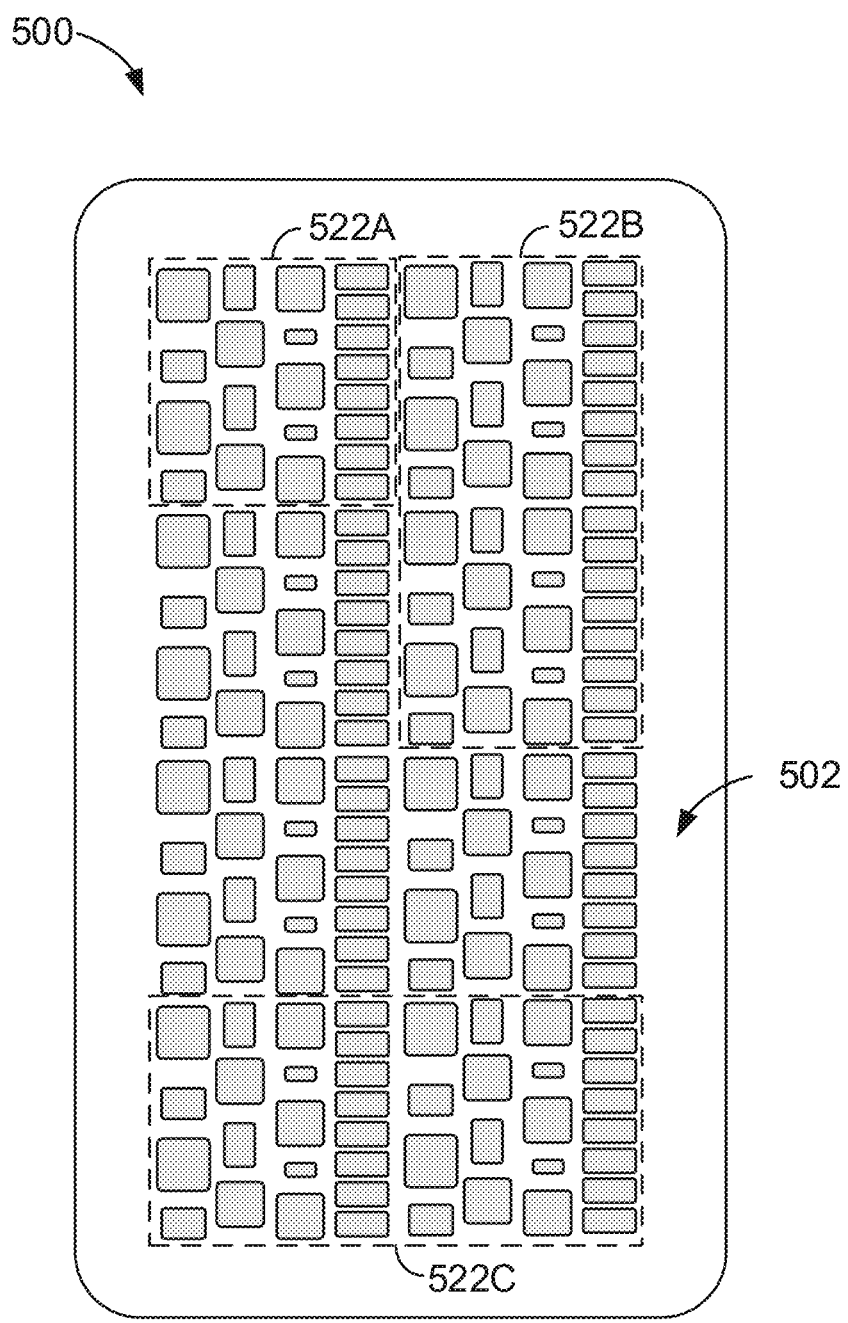
FIG. 5 shows a display of an electronic system, in accordance with some embodiments.

FIG. 5 shows a display of an electronic system 500, in accordance with some embodiments. The electronic system 500 may be an example embodiment of the electronic devices 100 and/or 200, and/or the electronic systems 300A-300D or 400, as described with respect to FIGS. 1, 2, 3A-3D and 4.

The electronic system 500 may include a display 502. The display 502 may be a porous display including, but not limited to, an OLED display or a micro-LED display. In other words, the display 502 may include display pixels and/or display sub-pixels (depicted in FIG. 5 as gray rectangles) separated by holes, gaps, or empty space. As shown in FIG. 5, the pattern of display pixels and/or display sub-pixels may vary over a limited region 522A of the display 502. However, aspects of the present disclosure recognize that the pattern may repeat over larger regions 522B and 522C of the display 502. Aspects of the present disclosure further recognize that distortion in a captured image may appear random and/or inconsistent due to variations in the pattern of display pixels and/or display sub-pixels. However, by aligning under-display optical sensing elements (e.g., optical sensing elements 704 of FIG. 7) with the repeating pixel pattern, the variations in distortion will be the same or substantially similar across each optical sensing element. It is noted that the display pixels and/or display sub-pixels may vary in shape and size, and they may be arranged in rows and columns, in a circular configuration, or in another configuration.

Figure 6:
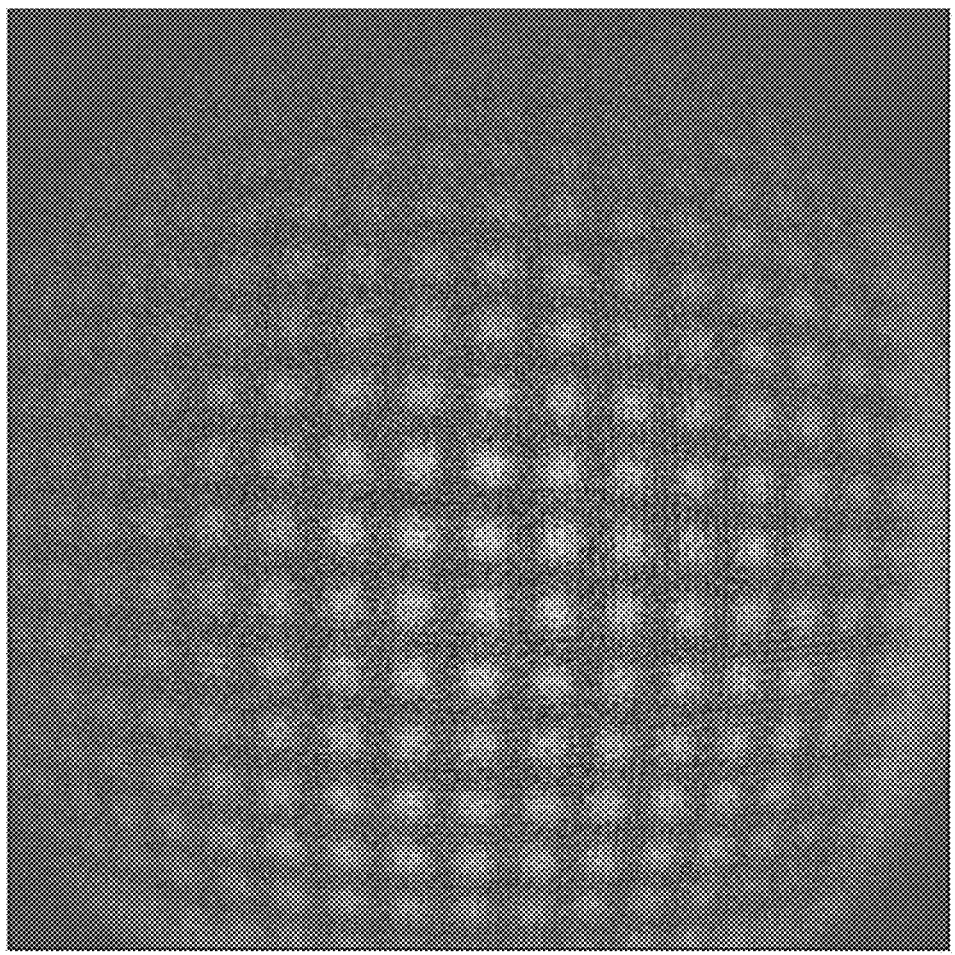
FIG. 6 shows an example image captured by a camera disposed under a display, in accordance with some embodiments.

FIG. 6 shows an example image 600 captured by a camera disposed under a display, in accordance with some embodiments. The image 600 may be captured by a camera disposed behind or beneath a porous display such as, for example, the camera 104, 106, 204, 304, 306, 404 or 406 of FIGS. 1, 2, 3A-3D and 4. As shown in FIG. 6, the image 600 includes a grid of dark lines and light dots—or a "screen door effect." The dark lines correspond to a pattern of display pixels and/or display sub-pixels, similar to the display pixel pattern depicted in FIG. 5. The dark lines are produced by the display pixels and/or display sub-pixels blocking some IR light from passing through the display. In contrast, the brighter dots correspond to gaps or holes between the display pixels and/or display sub-pixels. The bright dots are produced by IR light passing through the holes or gaps in the display to the camera below.

In some embodiments, an image captured by an under-display camera may include a grid or screen door effect that appears as though the under-display camera is simultaneously imaging through multiple layers of screen doors (or a stack of screen doors), where each screen door layer has a different pitch (i.e. hole-size or density). In such embodiments, IR light may pass through holes (or gaps) between display pixels and/or display sub-pixels of the screen door layers. Further, each point of IR light is spread horizontally and vertically into a different position (i.e., as a point spread function), and each point of IR light is spread in a similar fashion across the image, which may result in significant distortion.

As shown in FIG. 6, portions of the image 600 are obfuscated by the display pixels and/or display sub-pixels of the display. In other words, the display pixels and/or display sub-pixels may reduce the amount of IR light available for sensing, and effectively obstruct the FOV of the under-display camera. Thus, it may be desirable to filter or calibrate the images captured by the under-display camera in order to eliminate the screen door effect, distortion, or other artifacts.

Figure 7:
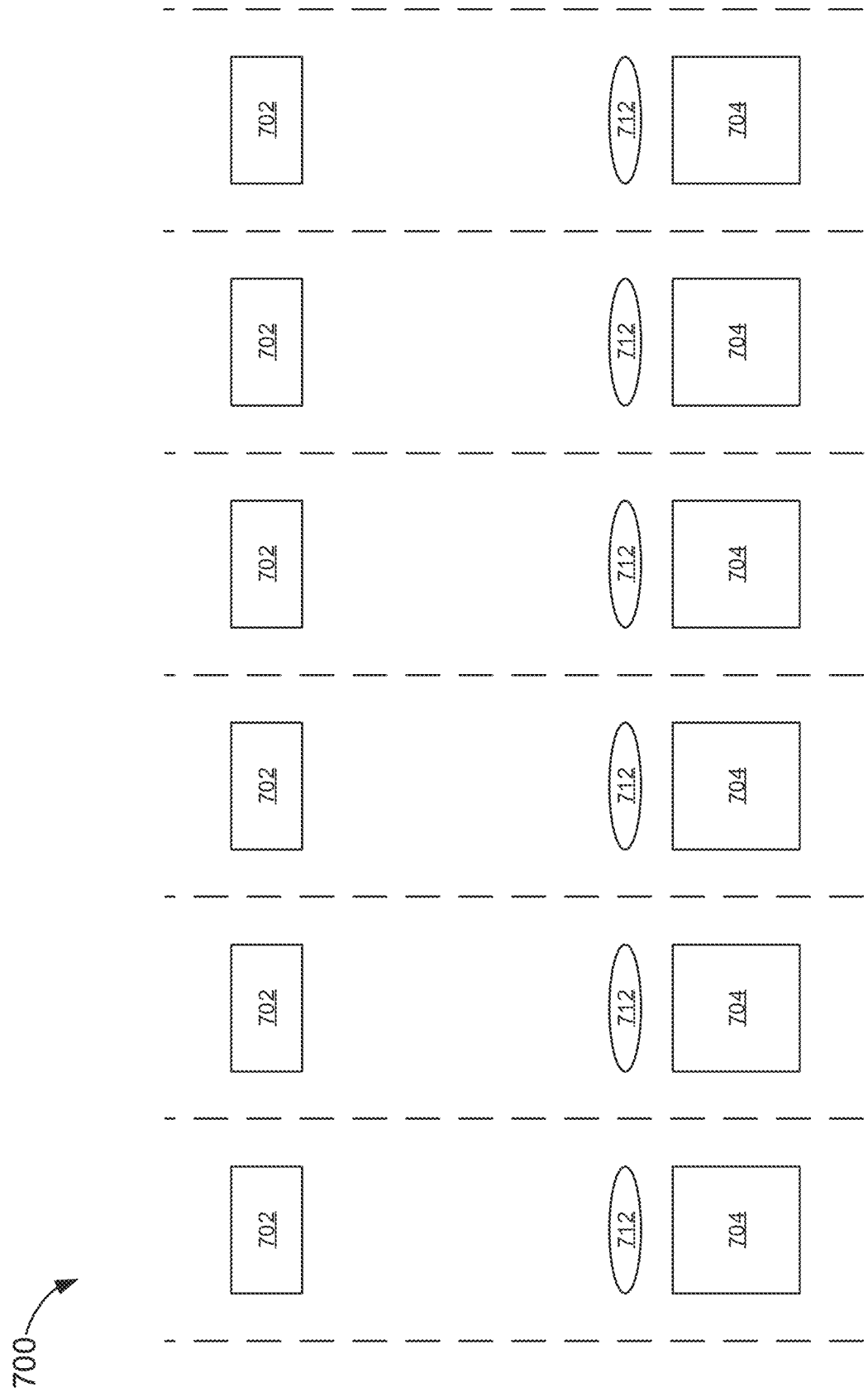
FIG. 7 shows an example arrangement of display pixels and/or display sub-pixels and optical sensing elements, in accordance with some embodiments.

FIG. 7 shows an example arrangement 700 of display pixels and/or display sub-pixels 702 ("display pixels 702") and optical sensing elements 704, in accordance with some embodiments. Each of the display pixels 702 may be an example embodiment of the display pixels shown in FIGS. 4, 5 and/or 6. The optical sensing elements 704 may be, individually or collectively, an embodiment of a camera such as, for example, the camera 104, 106, 204, 304, 306, 404, or 406 described with respect to FIGS. 1, 2, 3A-3D and 4.

In some embodiments, the display pixels 702 may be part of a porous display such as, for example, an OLED display or a micro-LED display. Each of the optical sensing elements 704 may comprise an NIR CMOS sensor, and each optical sensing element 704 may have a corresponding micro-lens 712. While only six display pixels 702 are shown in FIG. 7, in actual embodiments, the under-display imaging system 700 may include nearly any number of display pixels 702 (e.g., hundreds, thousands, millions, or more), and a corresponding number of optical sensing elements 704 and micro-lenses 712.

In the example of FIG. 7, the display pixels 702 may be aligned with the optical sensing elements 704. In some embodiments, each of the optical sensing elements 704 may be aligned with a region of a display containing a repeating pixel pattern, such as the example region 522B or 522C of FIG. 5. Due to the alignment, the screen door effect or other distortion may appear as a consistent or repeating pattern in images captured by the optical sensing elements 704. Aspects of the present disclosure recognize that a repeating pattern of distortion may be easier to filter out from captured images. For example, neural network models may be more easily trained to recognize repeating patterns in images, and may provide more robust filtering of the screen door effect when the pattern is repeated.

Aspects of the present disclosure further recognize that, when an object is imaged in a bright or sunny environment, the display pixels 702 may become saturated or wash out. As a result, some display pixels may be unsuitable for imaging in both bright and dark environments. In some embodiments, the display pixels 702 may comprise nonlinear or logarithmic pixels. Because the charge stored by such logarithmic pixels varies non-linearly with respect to the brightness or intensity of light, the display pixels 702 may be well-suited for imaging in both bright and dark conditions.

Figure 8:
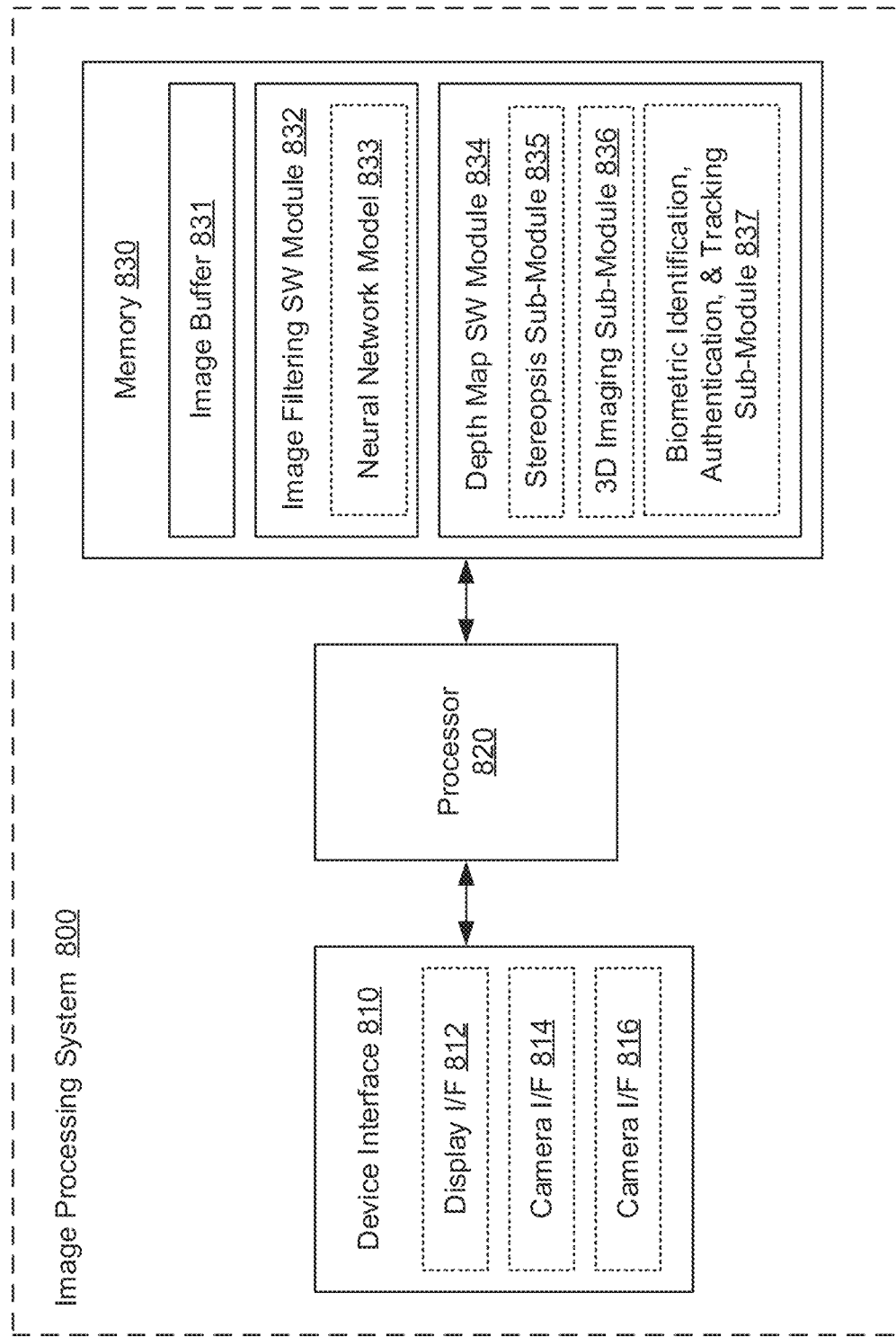
FIG. 8 shows a block diagram of an image processing system, in accordance with some embodiments.

FIG. 8 shows a block diagram of an image processing system 800, in accordance with some embodiments. The image processing system 800 includes a device interface 810, a processor 820, and a memory 830. For purposes of discussion herein, the processor 820 is shown in FIG. 8 as being coupled to the device interface 810 and the memory 830. For actual embodiments, the device interface 810, the processor 820, and/or the memory 830 may be connected together using one or more buses (not shown for simplicity). It is noted that, in some embodiments, the image processing system 800 may be an application specific integrated circuit (ASIC) or other integrated circuit (IC) of any of the electronic devices 100 and/or 200, and/or electronic systems 300A-300D, 400, and/or 500 described above with respect to FIGS. 1, 2, 3A-3D, 4 and 5.

The device interface 810 may transmit and receive signals to and from input devices including, but not limited to, one or more cameras (not shown for simplicity) and/or a display. In some embodiments, the device interface 810 may include camera interfaces 814 and 816. Each camera interface 814 and 816 may be used to communicate with a different camera. For example, the first camera interface 814 may transmit activation signals to, and receive sensor information from, a first camera to capture images of an object or scene. Further, the second camera interface 816 may transmit activation signals to, and receive sensor information from, a second camera to capture images of the same object and/or scene. In some embodiments, the device interface 810 may further include display interface 812. The display interface 812 may be used to communicate with a display and/or to provide a visual interface to a user of the image processing system 800.

The memory 830 may include an image buffer 831 to store images received via the camera interfaces 814 and/or 816. The memory 830 may also include a non-transitory computer-readable medium (e.g., one or more nonvolatile memory elements, such as EPROM, EEPROM, Flash memory, a hard drive, and so on) that may store at least the following SW modules:

an image filtering SW module 832 to filter images received via the camera interfaces 814 and/or 816, the image filtering SW module 832 further including:
a neural network model 833 to filter, reduce, or eliminate noise from images received via the camera interfaces 814 and/or 816; and a depth map SW module 834 to determine depth information for objects or features in images received via the camera interfaces 814 and/or 816, the depth map SW module 834 further including:
a stereopsis sub-module 835 to extract depth information from a pair of images received via the respective camera interfaces 814 and 816;
a 3D imaging sub-module 836 to generate 3D images based, at least in part, on the depth information; and
a biometric identification, authentication, and tracking (BIAT) sub-module 837 to identify, authenticate, and/or track subjects or objects in images based, at least in part, on the depth information.

Each SW module includes instructions that, when executed by processor 820, cause the image processing system 800 to perform the corresponding functions.

For example, the processor 820 may execute the image filtering SW module 832 (or "image filter") to filter images received via the camera interfaces 814 and/or 816. In executing the image filtering SW module 832, the processor 820 may use the neural network model 833 to filter, reduce, or eliminate noise (such as a screen door effect) from images received via the camera interfaces 814 and/or 816. The processor 820 may further execute the depth map SW module 834 to determine depth information for objects or features in images received via the camera interfaces 814 and/or 816. In executing the depth map SW module 834, the processor 820 may use the stereopsis sub-module 835, the 3D imaging sub-module 836, and/or the BIAT sub-module 837. For example, the processor 820 may execute the stereopsis sub-module 835 to extract depth information from a pair of images received via the respective camera interfaces 814 and 816. The processor 820 may further execute the 3D imaging sub-module 836 to generate 3D images based, at least in part, on the depth information. The processor 820 may also execute the BIAT sub-module 837 to identify, authenticate, and/or track subjects or objects in images based, at least in part, on the depth information.

Figure 9:
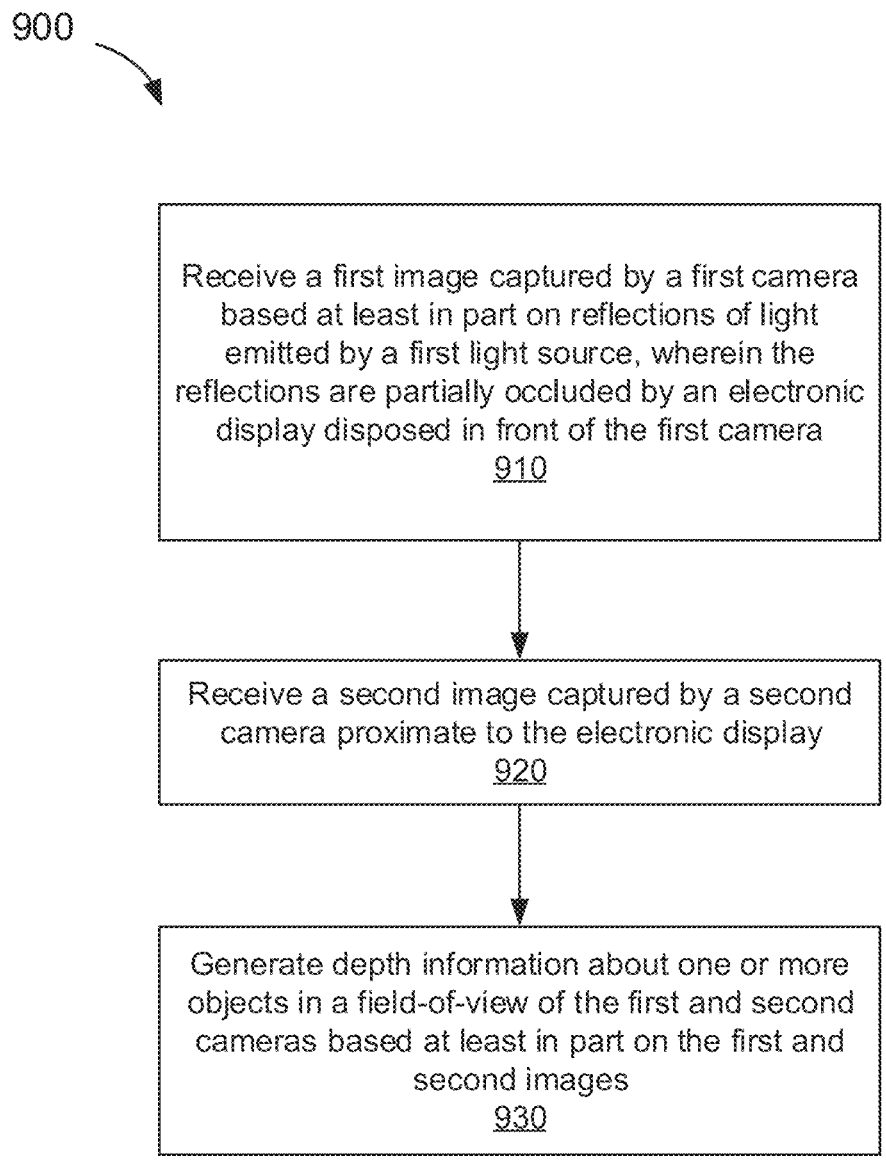
FIG. 9 shows an illustrative flowchart depicting an example operation for generating depth information about an object or scene, in accordance with some embodiments.

FIG. 9 shows an illustrative flowchart depicting an example operation 900 for generating depth information about an object or scene, in accordance with some embodiments. With reference for example to FIG. 1, the operation 900 may be performed by the electronic device 100.

The electronic device 100 may receive a first image of an object captured by a first camera disposed behind an electronic display (910). The first image may be based at least in part on reflections of light (e.g., NIR light) emitted by an illuminator (or first light source).

The electronic device 100 may also receive a second image of the object captured by a second camera proximate to the electronic display (920). In some embodiments, the second camera may be disposed in the same plane as the electronic display and the illuminator, as shown in FIG. 2.

After the electronic device 100 receives the first and second images, the electronic device 100 may process the images to generate depth information (930). In some embodiments, noise or distortion in the first and second images may be filtered using one or more neural network models. As described above, the depth information may indicate a distance or depth of the object in the FOV of the first and second cameras, and the depth information may be based at least in part on the first and second images. In some embodiments, the electronic device 100 may combine the first and second images and extract depth information from the images about the object.

Figure 10B:
FIG. 10B shows the example image of FIG. 10A after filtering.
Figure 10A:
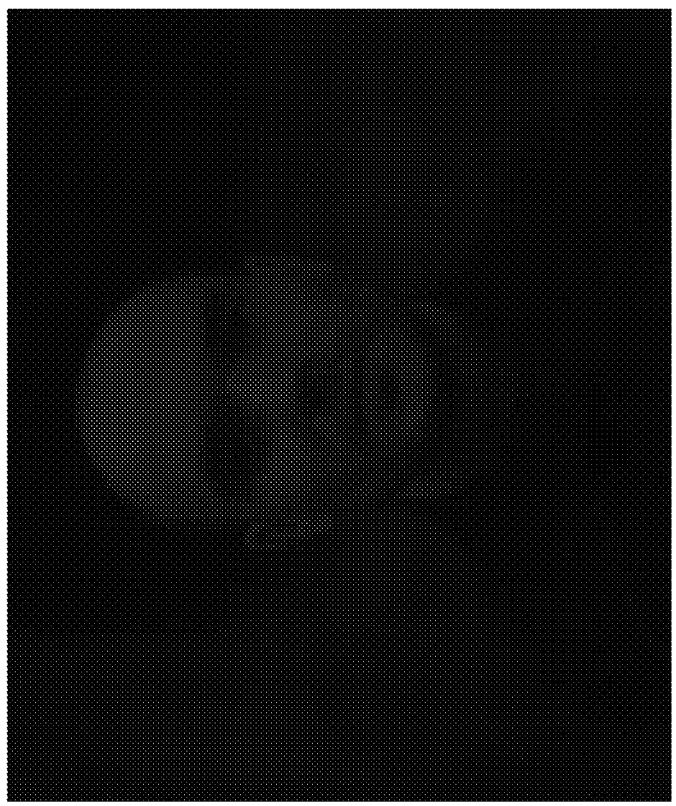
FIG. 10A shows an example image captured by an under-display camera.

FIG. 10A shows an example image 1010 captured by an under-display camera. With reference to FIG. 8, the image 1010 may be transmitted from the under-display camera to, for example, the camera interface 814. The camera interface 814 may then transmit the image 1010 to the image buffer 831 for storage. As shown in FIG. 10A, the image 1010 is obfuscated by the screen door effect. Thus, it may be desirable to filter image 1010 to remove the distortion.

FIG. 10B shows example image 1020, which is the image 1010 of FIG. 10A after filtering. To generate image 1020, with reference to FIG. 8, the image buffer 831 may transmit image 1010 to the image filtering SW module 832. The image filtering SW module 832 may use the neural network model 833 to filter out the screen door effect from the image 1010. The resulting image is image 1020, which, as illustrated in FIG. 10B, more clearly shows a person.

In some embodiments, the neural network model 833 may include a CNN trained to filter out the screen door effect or other noise from a captured image. In other words, the CNN may be trained to infer an original or clean image of an object or scene from an obfuscated image of the object or scene. In some embodiments, the CNN may be trained by receiving and processing at least one original image of an object or scene, and at least one obfuscated image of the object or scene. In some embodiments, in lieu of, or in addition to the CNN, a reverse point spread function transform may be used to filter an image. Accordingly, the image filtering SW module 832 may filter an image from an under-display camera using the neural network model 833 and/or a reverse point spread function transform.

Figure 11:
FIG. 11 shows an example 3D image, in accordance with some embodiments.

FIG. 11 shows an example 3D image 1110, in accordance with some embodiments. To generate the example 3D image 1110, with reference to FIG. 8, each of two under-display cameras may simultaneously capture an image of a group of people, and the captured images may be transmitted to the camera interfaces 814 and 816, respectively. The camera interfaces 814 and 816 may then transmit the images to the image buffer 831 for storage. Subsequently, the image buffer 831 may transmit the images to the image filtering SW module 832, which may remove a screen door effect or any other distortion from the images using the neural network model 833. The depth map SW module 834 may then use the stereopsis sub-module 835 to combine the filtered images and extract depth information from the images.

In some embodiments, in lieu of, or in addition to stereopsis, the depth map SW module 834 may use other methods to determine depth information from the pair of images. For example, with reference to FIGS. 4 and 8, the camera module 410 may use special optics, and the depth map SW module 834 may use special algorithms with diffractive optics, multiple apertures or multiple FOVs (where the aperture or FOV of one camera varies from that of another), or coded-or-phase-aperture, to extract depth information. As another example, the depth map SW module 834 may use one camera to sense one range of wavelengths (e.g., visible light) and use another camera to sense another range of wavelengths (e.g., IR light). The depth map SW module 834 may then triangulate images captured by the two cameras to extract depth information.

Once the depth information has been extracted, the 3D imaging sub-module 836 may generate the 3D image 1110 of FIG. 11 based, at least in part, on the depth information. In some embodiments, one of the two images processed by the 3D imaging sub-module 836 may include color (or RGB) information from a standard optical RGB camera. The 3D imaging sub-module 836 may superimpose the color information onto a 3D image to generate a color 3D image.

In some embodiments, the 3D imaging sub-module 836 may be configured to project a 3D image onto a display via the display interface 812. The 3D imaging sub-module 836 may also be configured to modify or rotate the 3D image, thereby permitting a user to interact with the 3D image. For example, in some aspects, the 3D imaging sub-module 836 may be configured to provide a bokeh focus function. In other words, when a 3D image is projected on a display via the display interface 812, a user may be able to determine which portion(s) of the 3D image appear in focus, and which portion(s) of the 3D image appear blurred or out-of-focus. With respect to any blurred portion(s), the user may be able to adjust the degree or type of blurring.

Figure 12:
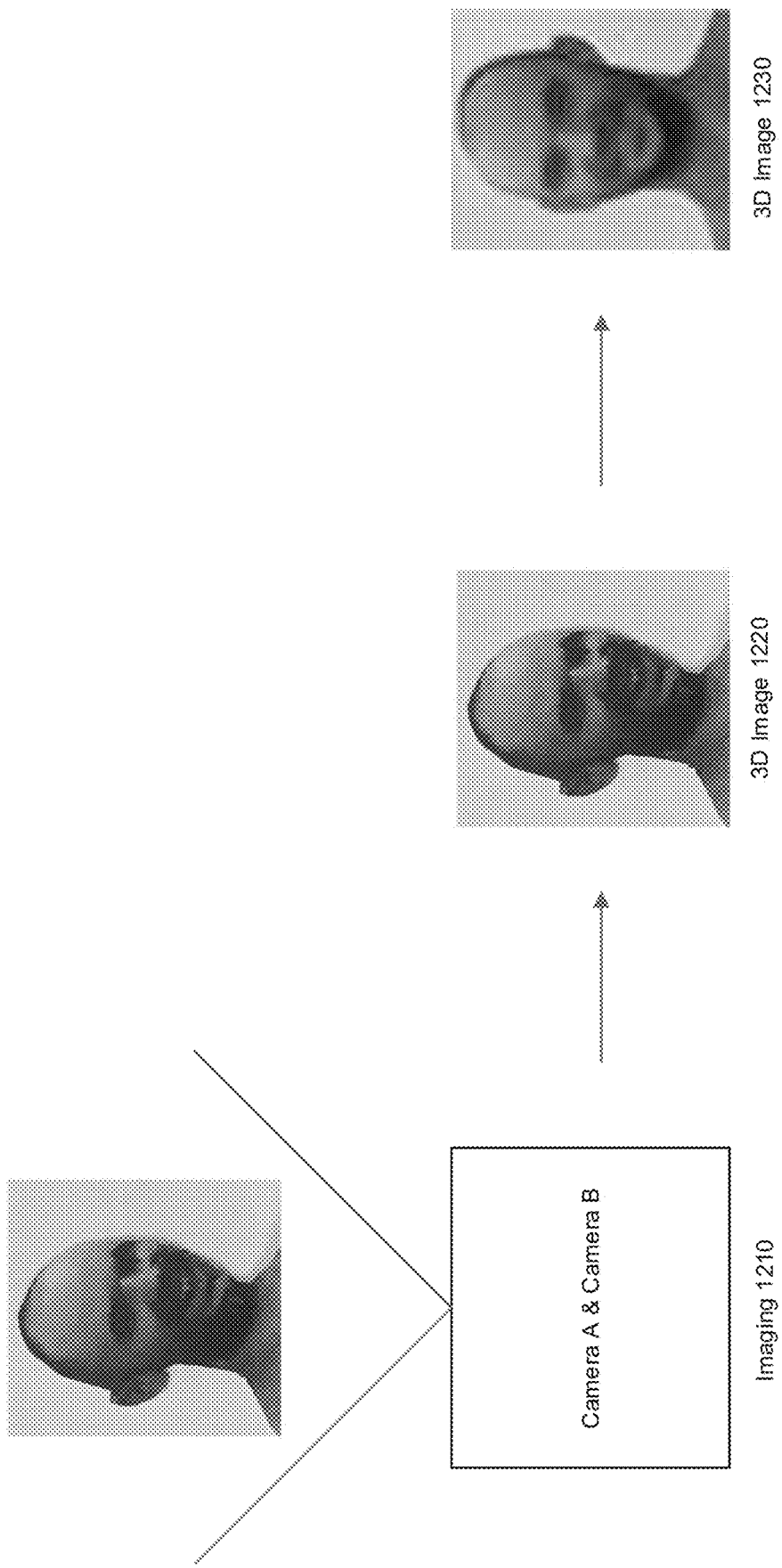
FIG. 12 shows example applications of depth information, in accordance with some embodiments.

FIG. 12 shows example applications of depth information, in accordance with some embodiments. With reference to FIG. 8, the depth map SW module 834 may use the BIAT sub-module 837 to identify, authenticate, and/or track subjects or objects in images based, at least in part, on depth information. For example, as shown in FIG. 12, each of cameras A and B may capture an image of a person during imaging 1210. As described above, the image filtering SW module 832 may use the neural network model 833 to remove distortion from the images, and the depth map SW module 834 may use the stereopsis sub-module 835 to extract depth information from the images. The 3D imaging sub-module 836 may then generate a 3D image such as 3D image 1220 based, at least in part, on the depth information from the images.

In some embodiments, the BIAT sub-module 837 may identify any subjects, objects or features in a 3D image such as, for example, the person in the 3D image 1220. For example, the BIAT sub-module 837 may compare the 3D image 1220 to stored data (e.g., reference images of people and/or users). Where the BIAT sub-module 837 determines a match between the 3D image 1220 and the stored data, the BIAT sub-module 837 may authenticate or verify the identity of the person in the 3D image 1220 or simply determine that a person is present in the 3D image 1220. Accordingly, the BIAT sub-module 837 may be used to perform biometric identification and/or authentication based, at least in part, on depth information.

In some embodiments, the BIAT sub-module 837 may be further configured to perform biometric tracking. For example, with respect to FIG. 12, the 3D image 1220 may correspond to two images captured by cameras at a first instance of time. The BIAT sub-module 837 may determine the location of the person in the 3D image 1220, and then store the location in, for example, the image buffer 831. The BIAT sub-module 837 may then receive a 3D image based on two images captured by cameras at a second instance of time, where the second instance of time is subsequent to the first instance of time. The BIAT sub-module 837 may then identify and/or authenticate a person in the 3D image corresponding to the second instance of time. If the BIAT sub-module 837 determines that the person in the 3D image corresponding to the second instance of time is the same as the person in the 3D image 1220 corresponding to the first instance of time, the BIAT sub-module 837 may determine the location of the person in the 3D image corresponding to the second instance of time and store the location in, for example, the image buffer 831. The BIAT sub-module 837 may then use the stored locations of the 3D images corresponding to the first and second instances of time to track the location or movement of the person over time. In other embodiments, the BIAT sub-module 837 may be configured to track objects such as eyes, fingers or hands, and/or the BIAT sub-module 837 may be configured to perform gesture recognition and/or air touch. The BIAT sub-module 837 may further be configured to identify and/or track biometric indications such as a heartbeat (i.e., pulse) or blood pressure.

In some aspects, the BIAT sub-module 837 may perform more robust identification, authentication and/or tracking by rotating and/or changing the distance of a subject or object in a 3D image before comparing the 3D image to stored data. It is noted that certain authentication algorithms require a user's face to be positioned in a specific orientation and/or location of a camera's FOV (e.g., directly facing the camera) for proper analysis. Thus, with reference to the 3D image 1220 of FIG. 12, the BIAT sub-module 837 may be configured to rotate the 3D image 1220 such that the face of the person in the 3D image 1220 conforms with a desired orientation (e.g., an orientation similar to that of people in the reference images), such as the orientation of 3D image 1230. The BIAT sub-module 837 may then analyze specific data points in the 3D image 1230 (such as a general alignment of the person's eyes, nose, mouth, and/or other easily identifiable features) to compare the 3D image 1230 with stored reference images. Accordingly, the BIAT sub-module 837 may more effectively perform identification, authentication, and/or tracking.

It is noted that certain captured images (e.g., obfuscated or filtered images) and image content (e.g., 3D images or identified persons, objects, or scenes) may be stored in a secure repository (e.g., in a trusted environment) on any of the electronic devices 100 and/or 200, and/or any of the electronic systems 300A-300D, 400 and/or 500 of FIGS. 1, 2, 3A-3D, 400 and 500. The secure repository may be virtually and/or physically partitioned from the rest of the electronic system such that only applications and/or hardware residing within the trusted environment may have access to the data stored in the secure repository. In some aspects, the secure repository may be formed at least in part within the memory 830. Thus, certain captured images and image content may be stored within the secure repository of the memory 830 (e.g., within the image buffer 831).

In some embodiments, the neural network model 833 may reside, at least in part, within a trusted environment in any of the electronic devices 100 and/or 200, and/or any of the electronic systems 300A-300D, 400 and/or 500 of FIGS. 1, 2, 3A-3D, 400 and/or 500. Placing the neural network model 833 within the trusted environment enables the neural network model 833 to perform machine learning (e.g., with a CNN) on protected captured images and image content.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A device comprising:
   a display;
   a first light source configured to emit light, the first light source adjacent to the display;
   a first camera disposed behind the display, the first camera configured to detect reflections of the light emitted by the first light source adjacent to the display and to capture a first image based at least in part on the reflections, wherein the reflections are partially occluded by the display;
   a second camera adjacent to the display, the second camera configured to capture a second image; and
   a depth map generator configured to generate depth information about one or more objects in a field-of-view (FOV) of the first and second cameras based at least in part on the first and second images.

2. The device of claim 1, wherein the first light source is configured to emit near infrared (NIR) light, and each of the first and second cameras is configured to detect the NIR light.

3. The device of claim 1, wherein the first light source is configured to emit near infrared (NIR) light, the first camera is configured to detect the NIR light, and the second camera is configured to detect visible light.

4. The device of claim 1, wherein the display comprises a plurality of display pixels, wherein an empty space separates each display pixel from other display pixels of the plurality of display pixels, and wherein each empty space is configured to transmit the reflections.

5. The device of claim 1, wherein the display comprises an organic light-emitting diode display.

6. The device of claim 1, wherein the display comprises a micro light-emitting diode display.

7. The device of claim 1, wherein the first camera comprises a plurality of first optical sensors that are aligned with display pixels of the display.

8. The device of claim 7, wherein each optical sensor of the plurality of first optical sensors is aligned with a display pixel of a region of the display, wherein the region contains a plurality of display pixels comprising a repeating pixel pattern.

9. The device of claim 1, further comprising:
   an image filter configured to filter out noise or interference from the first image captured by the first camera.

10. The device of claim 9, wherein the depth map generator is further configured to generate the depth information about the one or more objects in the FOV of the first and second cameras based at least in part on the filtered first image.

11. The device of claim 9, wherein the image filter uses a neural network model to filter out the noise or interference from the first image captured by the first camera.

12. The device of claim 9, wherein the image filter uses a reverse point spread function transform to filter out the noise or interference from the first image captured by the first camera.

13. The device of claim 1, wherein the depth map generator is further configured to generate a three-dimensional image based at least in part on the depth information.

14. A method comprising:
   receiving a first image captured by a first camera based at least in part on reflections of light emitted by a first light source adjacent to an electronic display, wherein the electronic display is disposed in front of the first camera, and wherein the reflections are partially occluded by the electronic display;
   receiving a second image captured by a second camera adjacent to the electronic display; and
   generating depth information about one or more objects in a field-of-view (FOV) of the first and second cameras based at least in part on the first and second images.

15. The method of claim 14, further comprising:
   emitting near infrared (NIR) light from the first light source, wherein each of the first and second cameras is configured to detect the NIR light.

16. The method of claim 14, further comprising:
   emitting near infrared (NIR) light from the first light source, wherein the first camera is configured to detect the NIR light, and the second camera is configured to detect visible light.

17. The method of claim 14, further comprising:
   filtering out noise or interference from the first image.

18. The method of claim 17, wherein generating the depth information about the one or more objects in the FOV of the first and second cameras is further based at least in part on the filtered first image.

19. The method of claim 14, further comprising:
   filtering out noise or interference from the first image using a neural network model.

20. The method of claim 14, further comprising:
   filtering out noise or interference from the first image using a reverse point spread function transform.

21. The method of claim 14, further comprising:
   generating a three-dimensional image based at least in part on the depth information.

22. A processing system comprising:
   a processor; and
   a memory storing instructions that, when executed by the processor, cause the processing system to:

receive a first image captured by a first camera based at least in part on reflections of light emitted by a first light source adjacent to an electronic display, wherein the electronic display is disposed in front of the first camera, and wherein the reflections are partially occluded by the electronic display;

receive a second image captured by a second camera adjacent to the electronic display; and generate depth information about one or more objects in a field-of-view (FOV) of the first and second cameras based at least in part on the first and second images.

\* \* \* \* \*